United States Patent
Zhang et al.

(10) Patent No.: US 11,219,059 B2
(45) Date of Patent: Jan. 4, 2022

(54) METHOD FOR TRANSMITTING SYSTEM INFORMATION ON DEMAND, BASE STATION AND TERMINAL

(71) Applicant: GUANGDONG OPPO MOBILE TELECOMMUNICATIONS CORP., LTD., Guangdong (CN)

(72) Inventors: Zhi Zhang, Dongguan (CN); Ning Yang, Dongguan (CN)

(73) Assignee: SHENZHEN HEYTAP TECHNOLOGY CORP., LTD., Guangdong (CN)

( * ) Notice: Subject to any disclaimer, the term of this patent is extended or adjusted under 35 U.S.C. 154(b) by 0 days.

(21) Appl. No.: 16/577,460

(22) Filed: Sep. 20, 2019

(65) Prior Publication Data

US 2020/0015265 A1 Jan. 9, 2020

Related U.S. Application Data

(63) Continuation of application No. PCT/CN2017/077382, filed on Mar. 20, 2017.

(51) Int. Cl.
*H04W 74/00* (2009.01)
*H04W 72/12* (2009.01)
*H04W 48/10* (2009.01)

(52) U.S. Cl.
CPC ......... *H04W 74/006* (2013.01); *H04W 48/10* (2013.01); *H04W 72/1289* (2013.01); *H04W 74/004* (2013.01)

(58) Field of Classification Search
CPC ............... H04W 74/006; H04W 48/10; H04W 72/1289; H04W 74/004
See application file for complete search history.

(56) References Cited

U.S. PATENT DOCUMENTS

2008/0130588 A1* 6/2008 Jeong ................ H04L 5/003
370/335
2009/0232095 A1* 9/2009 Ahn .................... H04W 74/006
370/331

(Continued)

FOREIGN PATENT DOCUMENTS

CN 102111846 A 6/2011
CN 102892192 A 1/2013

(Continued)

OTHER PUBLICATIONS

International Search Report of PCT/CN2017/077382.

(Continued)

*Primary Examiner* — Jael M Ulysse
(74) *Attorney, Agent, or Firm* — Ladas & Parry, LLP (57) ABSTRACT

Embodiments of the present disclosure disclose a method for transmitting system information, a base station and a terminal, the method including: receiving, by a base station, MSG1 transmitted by a terminal; determining an access purpose of the terminal according to a preset mapping relationship between a physical random access channel resource used by the terminal to transmit the MSG1 and the access purpose of the terminal, the access purpose including requesting the system information, requesting initial access, or requesting the system information and the initial access at one time; transmitting, by the base station, MSG2 to the terminal if the access purpose of the terminal is to request the system information, or to request the system information and the initial access at one time. It is possible to transmit the system information according to the requirements of the terminal, which is beneficial to optimize the system efficiency.

12 Claims, 7 Drawing Sheets

(56) References Cited

U.S. PATENT DOCUMENTS

| | | | | |
|---|---|---|---|---|
| 2009/0316645 | A1* | 12/2009 | Uemura | H04W 72/04 370/329 |
| 2009/0323607 | A1* | 12/2009 | Park | H04L 61/10 370/329 |
| 2010/0296467 | A1* | 11/2010 | Pelletier | H04W 74/0833 370/329 |
| 2011/0039499 | A1* | 2/2011 | Zhang | H04W 74/008 455/67.11 |
| 2011/0075629 | A1* | 3/2011 | Seo | H04W 74/002 370/330 |
| 2012/0002617 | A1* | 1/2012 | Vujcic | H04W 74/002 370/329 |
| 2012/0099543 | A1* | 4/2012 | Yang | H04W 74/006 370/329 |
| 2012/0213151 | A1* | 8/2012 | Zhao | H04W 74/006 370/328 |
| 2013/0114515 | A1* | 5/2013 | Koo | H04J 11/0023 370/329 |
| 2014/0016534 | A1* | 1/2014 | Kim | H04L 5/0053 370/312 |
| 2014/0079011 | A1* | 3/2014 | Wiberg | H04W 74/006 370/329 |
| 2014/0233538 | A1* | 8/2014 | Zhang | H04W 72/1205 370/336 |
| 2014/0348122 | A1* | 11/2014 | Li | H04W 72/04 370/330 |
| 2015/0003375 | A1* | 1/2015 | Liu | H04W 74/0833 370/329 |
| 2015/0237655 | A1* | 8/2015 | Lu | H04W 74/08 370/329 |
| 2015/0282215 | A1* | 10/2015 | Eriksson | H04W 74/0833 370/329 |
| 2015/0359003 | A1* | 12/2015 | Kim | H04W 74/0891 370/336 |
| 2016/0270038 | A1 | 9/2016 | Papasakellariou | H04L 1/08 |
| 2017/0006642 | A1* | 1/2017 | Park | H04W 72/042 |
| 2018/0054837 | A1* | 2/2018 | Islam | H04W 74/0833 |
| 2018/0116000 | A1* | 4/2018 | Ly | H04W 74/006 |
| 2019/0045426 | A1* | 2/2019 | Yan | H04W 72/042 |

FOREIGN PATENT DOCUMENTS

| | | |
|---|---|---|
| CN | 105009479 A | 10/2015 |
| CN | 106341896 A | 1/2017 |
| JP | 2017507574 A | 3/2017 |
| WO | 2018084669 A1 | 5/2018 |

OTHER PUBLICATIONS

Written Opinion of the International Searching Authority of PCT/CN2017/077382.

The Extended European Search Report of corresponding European application No. 117902335.3, dated Feb. 17, 2020.

Mediatek Inc: "NR SI Unicast", 3GPP Draft; R2-1701362 NR SI Unicast, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 13, 2017-Feb. 17, 2017 Feb. 12, 2017(Feb. 12, 2017), XP051212024.

Guangdong Oppo Mobile Telecom:"Discussion on the request for the on demand SI", 3GPP Draft; R1-1701940, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017 Feb. 12, 2017(Feb. 12, 2017), XP051209102.

The First Office Action of corresponding Chinese application No. 201780088475.2, dated Jun. 17, 2020, with search report.

The first Office Action of corresponding European application No. 17902335.3, dated Oct. 29, 2020.

The first Office Action of corresponding Indian application No. 201917039811, dated Dec. 31, 2020.

The first Office Action of corresponding Japanese application No. 2019-552033, dated Feb. 16, 2021.

Fujitsu, Considerations about on-demand SI acquiring procedure, 3GPP TSG RAN WG2 #97 R2-1701397, Feb. 3, 2017.

The first Office Action of corresponding Korean application No. 10-2019-7029142, dated Apr. 29, 2021.

InterDigital Communications, Acquisition of Other-SI, 3GPP TSG RAN WG2 NR Ad Hoc R2-1700230, Jan. 7, 2017.

The second Office Action of corresponding European application No. 17902335.3, dated Apr. 21, 2021.

The third Office Action of corresponding European application No. 17902335.3, dated Jul. 29, 2021.

* cited by examiner

FIG. 9

METHOD FOR TRANSMITTING SYSTEM INFORMATION ON DEMAND, BASE STATION AND TERMINAL

CROSS-REFERENCE TO RELATED APPLICATIONS

This application is a continuation of International Application No. PCT/CN2017/077382, filed on Mar. 20, 2017, the content of which is incorporated herein by reference in its entirety.

TECHNICAL FIELD

The present disclosure relates to the field of communication technologies, and in particular, to a method for transmitting system information, a base station and a terminal.

BACKGROUND

In a Long Term Evolution (LTE) system, system information (SI) is transmitted periodically, and the system information can be received regardless of whether a terminal is in a connected state or in an idle state. Scheduling periods of all the system information can be indicated by a System Information Block (SIB) 1. Because this periodic transmission mode may cause redundant transmission of the system information, for example, when system information SIBx is transmitted, and the terminal in the existing system has acquired the system information or does not need the system information, transmission of the SIBx will result in a waste of resources.

Therefore, in the design of a new wireless communication system such as the 5th Generation (5G) New Radio (NR) system, the system information can be divided into essential system information and non-essential system information. For the essential system information, for example, system information including information about such as access, it may be transmitted by a base station through a conventional broadcast method; and for the non-essential system information, the base station can perform transmission when the terminal requests it. However, as for what transmission method is better, it is still an unresolved problem.

SUMMARY

Embodiments of the present disclosure provide a method for transmitting system information, a base station and a terminal. The system information can be transmitted according to the requirements of the terminal, which is beneficial to optimize the system efficiency.

A first aspect of the embodiments of the present disclosure provides a method for transmitting system information, including:

receiving, by a base station, MSG1 transmitted by a terminal;

determining an access purpose of the terminal according to a preset mapping relationship between a physical random access channel resource used by the terminal to transmit the MSG1 and the access purpose of the terminal, the access purpose including requesting system information, requesting initial access, or requesting the system information and the initial access at one time; and transmitting, by the base station, MSG2 to the terminal if the access purpose of the terminal is to request the system information, or to request the system information and the initial access at one time, where the MSG2 including the system information or scheduling information corresponding to the system information.

In one possible implementation, if the access purpose of the terminal is to request the system information, the method further includes:

broadcasting the system information requested by the terminal.

In one possible implementation, if the access purpose of the terminal is to request the system information and the initial access at one time, the MSG2 further includes uplink scheduling information corresponding to MSG3.

In one possible implementation, if the access purpose of the terminal is to request the initial access, transmitting, by the base station, the MSG2 to the terminal, where the MSG2 includes uplink scheduling information corresponding to MSG3.

In one possible implementation, the preset mapping relationship between the physical random access channel resource and the access purpose of the terminal is a many-to-one mapping or a one-to-one mapping, and the preset mapping relationship is configured by the base station and notified to the terminal via a broadcast message, or the preset mapping relationship is pre-configured by a system and stored in the base station and the terminal.

A second aspect of the embodiments of the present disclosure provides a method for transmitting system information, including:

selecting, by a terminal and according to an access purpose, a physical random access channel resource between which and the access purpose a preset mapping relationship exists, the access purpose including requesting the system information, requesting initial access, or requesting the system information and the initial access at one time;

transmitting MSG1 to a base station using the selected physical random access channel resource; and receiving MSG2 transmitted by the base station if the access purpose of the terminal is to request the system information, or to request the system information and the initial access at one time, the MSG2 including the system information or scheduling information corresponding to the system information.

In one possible implementation, if the access purpose of the terminal is to request the system information, the method further includes:

receiving the system information broadcast by the base station.

In one possible implementation, if the access purpose of the terminal is to request the system information and the initial access at one time, the MSG2 further includes uplink scheduling information corresponding to MSG3.

In one possible implementation, if the access purpose of the terminal is to request initial access, receiving, the MSG2 transmitted by the base station, the MSG2 including uplink scheduling information corresponding to MSG3.

In one possible implementation, the preset mapping relationship between the physical random access channel resource and the access purpose of the terminal is a many-to-one mapping or a one-to-one mapping, and the preset mapping relationship is configured by the base station and obtained by the terminal receiving a broadcast message from the base station, or the preset mapping relationship is pre-configured by a system and stored in the base station and the terminal.

A third aspect of the embodiments of the present disclosure provides a base station, including:

a receiving unit, configured to receive MSG1 transmitted by a terminal;

a processing unit, configured to determine an access purpose of the terminal according to a preset mapping relationship between a physical random access channel resource used by the terminal to transmit the MSG1 and the access purpose of the terminal, the access purpose including requesting system information, requesting initial access, or requesting the system information and the initial access at one time; and a transmitting unit, configured to transmit MSG2 to the terminal if the access purpose of the terminal is to request the system information, or to request the system information and the initial access at one time, the MSG2 including the system information or scheduling information corresponding to the system information.

In one possible implementation, if the access purpose of the terminal is to request the system information, the transmitting unit is further configured to:

broadcast the system information requested by the terminal.

In one possible implementation, if the access purpose of the terminal is to request the system information and the initial access at one time, the MSG2 further includes uplink scheduling information corresponding to MSG3.

In one possible implementation, if the access purpose of the terminal is to request the initial access, the transmitting unit is further configured to transmit the MSG2 to the terminal, where the MSG2 includes uplink scheduling information corresponding to MSG3.

In one possible implementation, the preset mapping relationship between the physical random access channel resource and the access purpose of the terminal is a many-to-one mapping or a one-to-one mapping, and the preset mapping relationship is configured by the processing unit and notified to the terminal via a broadcast message, or the preset mapping relationship is pre-configured by a system and stored in the base station and the terminal.

A fourth aspect of the embodiments of the present disclosure provides a base station, including:

a processor, a memory, a transceiver, and a bus, the processor, the memory and the transceiver being connected to each other by the bus, where the transceiver is configured to transmit and receive a signal and communicate with a terminal, the memory is configured to store a set of program codes, and the processor is configured to invoke the program code stored in the memory, and perform the following operations:

receiving, through the transceiver, MSG1 transmitted by the terminal;

determining an access purpose of the terminal according to a preset mapping relationship between a physical random access channel resource used by the terminal to transmit the MSG1 and the access purpose of the terminal, the access purpose including requesting system information, requesting initial access, or requesting the system information and the initial access at one time; and transmitting, through the transceiver, MSG2 to the terminal, if the access purpose of the terminal is to request the system information, or to request the system information and the initial access at one time, the MSG2 including the system information or scheduling information corresponding to the system information.

In one possible implementation, if the access purpose of the terminal is to request the system information, the processor is further configured to:

broadcast, through the transceiver, the system information requested by the terminal.

In one possible implementation, if the access purpose of the terminal is to request the system information and the initial access at one time, the MSG2 further includes uplink scheduling information corresponding to MSG3.

In one possible implementation, if the access purpose of the terminal is to request the initial access, the base station transmits the MSG2 to the terminal, where the MSG2 includes uplink scheduling information corresponding to MSG3.

In one possible implementation, the preset mapping relationship between the physical random access channel resource and the access purpose of the terminal is a many-to-one mapping or a one-to-one mapping, and the preset mapping relationship is configured by the processor and notified to the terminal via a broadcast message, or the preset mapping relationship is pre-configured by a system and stored in the base station and the terminal.

A fifth aspect of the embodiments of the present disclosure provides a terminal, including:

a processing unit, configured to select, according to an access purpose, a physical random access channel resource between which and the access purpose a preset mapping relationship exists, the access purpose including requesting system information, requesting initial access, or requesting the system information and the initial access at one time;

a transmitting unit, configured to transmit MSG1 to a base station using the selected physical random access channel resource; and a receiving unit, configured to receive MSG2 transmitted by the base station if the access purpose of the terminal is to request the system information, or to request the system information and the initial access at one time, the MSG2 including the system information or scheduling information corresponding to the system information.

In one possible implementation, if the access purpose of the terminal is to request the system information, the receiving unit is further configured to:

receive the system information broadcast by the base station.

In one possible implementation, if the access purpose of the terminal is to request the system information and the initial access at one time, the MSG2 further includes uplink scheduling information corresponding to MSG3.

In one possible implementation, if the access purpose of the terminal is to request the initial access, the receiving unit is further configured to receive the MSG2 transmitted by the base station, where the MSG2 includes uplink scheduling information corresponding to MSG3.

In one possible implementation, the preset mapping relationship between the physical random access channel resource and the access purpose of the terminal is a many-to-one mapping or a one-to-one mapping, and the preset mapping relationship is configured by the base station and obtained by the receiving unit receiving a broadcast message from the base station, or the preset mapping relationship is pre-configured by a system and stored in the base station and the terminal.

A sixth aspect of the embodiments of the present disclosure provides a terminal, including:

a processor, a memory, a transceiver, and a bus, the processor, the memory, and the transceiver being connected to each other by the bus, wherein the transceiver is configured to transmit and receive a signal and communicate with a base station, the memory is configured to store a set of program codes, and the processor is configured to invoke the program code stored in the memory, and perform the following operations:

selecting, according to an access purpose, a physical random access channel resource between which and the access purpose a preset mapping relationship exists, the access purpose including requesting system information, requesting initial access, or requesting the system information and the initial access at one time;

transmitting MSG1 to a base station through the transceiver using the selected physical random access channel resource; and receiving, through the transceiver, MSG2 transmitted by the base station if the access purpose of the terminal is to request the system information, or to request the system information and the initial access at one time, the MSG2 including the system information or scheduling information corresponding to the system information.

In one possible implementation, if the access purpose of the terminal is to request the system information, the processor is further configured to:

receive, through the transceiver, the system information broadcast by the base station.

In one possible implementation, if the access purpose of the terminal is to request the system information and the initial access at one time, the MSG2 further includes uplink scheduling information corresponding to MSG3.

In one possible implementation, if the access purpose of the terminal is to request the initial access, the processor is further configured to receive, through the transceiver, the MSG2 transmitted by the base station, where the MSG2 includes uplink scheduling information corresponding to MSG3.

In one possible implementation, the preset mapping relationship between the physical random access channel resource and the access purpose of the terminal is a many-to-one mapping or a one-to-one mapping, and the preset mapping relationship is configured by the base station and obtained by processor receiving a broadcast message from the base station through the transceiver, or the preset mapping relationship is pre-configured by a system and stored in the base station and the terminal.

A seventh aspect of the embodiments of the present disclosure provides a computer storage medium, the computer storage medium including a set of program codes for performing the method according to any implementation of the first aspect of the embodiments of the present disclosure.

An eighth aspect of the embodiments of the present disclosure provides a computer storage medium, the computer storage medium including a set of program codes for performing the method according to any implementation of the second aspect of the embodiments of the present disclosure.

Implementing the embodiments of the present disclosure has the following beneficial effects:

when a base station receives MSG1 transmitted by a terminal, an access purpose of the terminal can be determined according to a preset mapping relationship between a PRACH resource used by the terminal to transmit the MSG1 and the access purpose of the terminal; when the access purpose of the terminal is to request system information, or to request the system information and initial access at one time, MSG2 including the system information or including scheduling information corresponding to the system information can be transmitted to the terminal, thereby implementing transmission of the system information. Functions of the MSG1 and the MSG2 are expanded, and the transmission of the system information can be completed without adding new signaling, which is conducive to saving signaling resources. And a compatibility with a random access interaction process of the terminal is enabled, which is conducive to improving the system efficiency.

BRIEF DESCRIPTION OF THE DRAWINGS

In order to more clearly illustrate the technical solutions in the embodiments of the present disclosure or in the prior art, the drawings to be used in the embodiments will be briefly described below, and obviously, the drawings in the following description only illustrate some embodiments of the present disclosure, and those skilled in the art can obtain other drawings according to these drawings without any creative efforts.

DETAILED DESCRIPTION OF THE EMBODIMENTS

The terms "comprises" and "includes" and any variations thereof in the specification, the claims and the drawings as described above of the present disclosure are intended to cover a non-exclusive inclusion. For example, a process, a method, a system, a product, or an apparatus that comprises a series of steps or units is not limited to the steps or units listed, but can also includes steps or units not listed, or can also includes other steps or units inherent to the process, the method, the product or the apparatus.

With the continuous growth of people's communication needs, communication technologies are developing rapidly, which can provide users with greater bandwidth and faster uplink and downlink transmission speed, etc. For example, in a 5G system, a system bandwidth up to 200 MHz can be provided. But as the number of users continues to increase, the working efficiency of a system becomes more and more important. In order to ensure efficient operation of a communication system, it is desirable for a base station to reduce redundant transmission of some information. Therefore, embodiments of the present disclosure provide a method for transmitting system information, enabling a base station to learn an access purpose of a terminal after receiving MSG1 transmitted by the terminal, thus to give a flexible response according to the access purpose of the terminal, thereby optimizing the system efficiency. For the convenience of description, the embodiments of the present disclosure are described with a 5G system, and those skilled in the art should understand that implementations in the embodiments of the present disclosure are equally applicable to existing communication systems and communication systems with higher levels such as 6G and 7G systems in the future, which are not limited in the embodiments of the present disclosure in any way.

The methods and the devices for transmitting system information according to the embodiments of the present disclosure are described in detail below with reference to the accompanying drawings.

Figure 1:
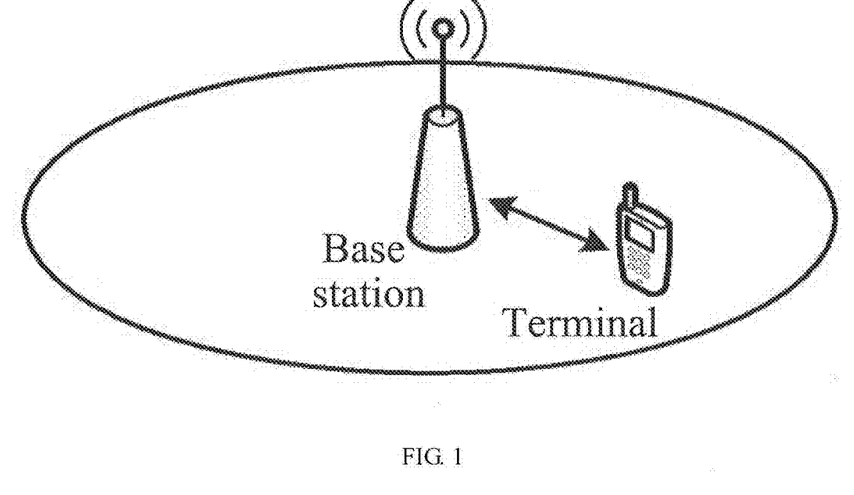
FIG. 1 is a schematic diagram of a framework of a communication system in an embodiment of the present disclosure.

Reference is made to FIG. 1, which is a schematic diagram of a framework of a communication system in an embodiment of the present disclosure, where a base station and at least one terminal may be included, and the terminal may also be referred to as a user equipment (UE).

The base station may be an evolved Node B (eNB), a Node B (NB), a Base Station Controller (BSC), a Base Transceiver Station (BTS), a home base station (for example, a Home evolved NodeB, or a Home Node B (HNB)), and a BaseBand Unit (BBU), etc. The base station can also be referred to by those skilled in the art as a base transceiver station, a wireless base station, a wireless transceiver, a transceiver function, a Base Station Subsystem (BSS) or some other suitable terminology. The base station can complete a random access procedure with the terminal through MSG1 to MSG4, establish a Radio Resource Control (RRC) connection with the terminal, and also complete transmission of system information through an interaction using MSG1 and MSG2, which is conducive to saving the signaling overhead and optimizing the system efficiency.

The terminal may include a cellular phone, a smart phone, a Session Initiation Protocol (SIP) phone, a laptop computer, a Personal Digital Assistant (PDA), a satellite radio, a global positioning system, a multimedia device, a video device, a digital audio player (for example, an MP3 player), a camera, a game console, or any other similarly functioning device. The terminal may also be referred to by a person skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handheld device, a user agent, a mobile client, a client, or some other suitable terminology. The terminal can select a suitable physical random access channel (PRACH) resource such as a time domain resource and/or a frequency domain resource and/or a code domain resource to inform the base station of the terminal's own access purpose and obtain the information that it wants.

The method for transmitting system information of the present disclosure will be described in detail below with reference to FIGS. 2 to 5.

Figure 2:
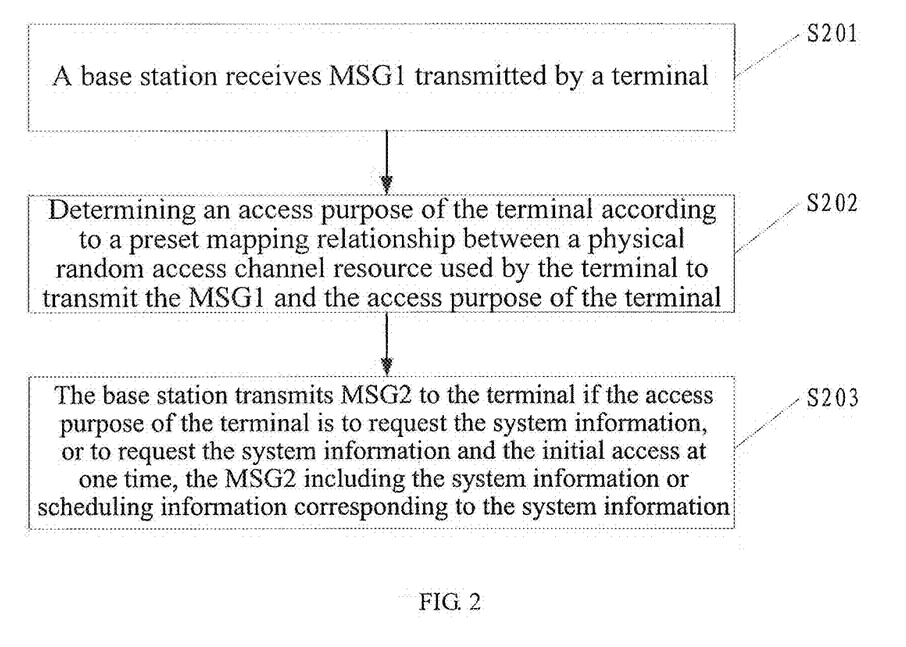
FIG. 2 is a schematic flow chart of a first embodiment of a method for transmitting system information according to the present disclosure.

Reference is made to FIG. 2, which is a schematic flowchart of a first embodiment of a method for transmitting system information according to the present disclosure; in this embodiment, the method for transmitting system information includes the following steps.

S201: a base station receives MSG1 transmitted by a terminal.

In an embodiment, the MSG1 transmitted by the terminal may include a system information request in addition to a regular random access request for requesting initial access, or may include only the system information request, thereby expanding a function of the MSG1.

S202: determining an access purpose of the terminal according to a preset mapping relationship between a physical random access channel resource used by the terminal to transmit the MSG1 and the access purpose of the terminal.

In an embodiment, the access purpose includes requesting system information, requesting initial access, or requesting the system information and the initial access at one time.

The terminal may notify the base station of these different access purposes by the PRACH resource selected for transmitting the MSG1. A system may pre-categorize the PRACH resource used by the terminal into at least three types according to the access purposes of the terminal: one is only used to request the system information from the system; one is only used to request the initial access; and one is used to request both the system information and the initial access.

It should be noted that the PRACH resource may be different combinations of a time domain resource, a frequency domain resource, and a code domain resource. For example, according to the foregoing at least three access purposes, the time and frequency resources used by the PRACH is divided into at least three blocks, and each time-frequency resource block corresponds to a different access purpose. For another example, according to the foregoing at least three access purposes, preambles used by the PRACH are divided into three types, and each type of preamble corresponds to a different access purpose. Or different combinations of time-frequency resources and preambles correspond to different access purposes.

In an embodiment, the preset mapping relationship between the physical random access channel resource and the access purpose of the terminal may be a many-to-one mapping, or may be a one-to-one mapping, and the preset mapping relationship may be configured by the base station and notified via a broadcast message to the terminal, or the preset mapping relationship is pre-configured by the system and stored in the base station and the terminal, and used as a system standard, which is not limited in the embodiments of the present disclosure in any way.

The terminal may select a corresponding PRACH resource to transmit a PRACH preamble according to different access purposes. When the terminal has a demand to simultaneously request the system information and the initial access, the terminal only needs to transmit MSG1 once, which is beneficial to save power consumption of the terminal, and can also reduce the collision probability of PRACH in the scenario of contention access.

S203: the base station transmits MSG2 to the terminal if the access purpose of the terminal is to request the system information, or to request the system information and the initial access at one time, the MSG2 including the system information or scheduling information corresponding to the system information.

That is, when the access purpose of the terminal is to request the system information, the base station may transmit the MSG2 which carries the system information requested by the terminal, or the scheduling information corresponding to the system information may be carried, and the terminal can obtain the requested system information according to the scheduling information after receiving the scheduling information. Here, the function of the MSG2 is expanded without the need V to construct new signaling. When the purpose of the terminal is to request the system information and the initial access at one time, what is required is only that the MSG2 also includes uplink scheduling information corresponding to MSG3, and then the terminal may initiate an RRC connection request to the base station according to the uplink scheduling information corresponding to MSG3, and receive MSG4 transmitted by the base station to complete a random access. And because the MSG1 further includes the system information request, the base station can also have the MSG2 carry the system information requested by the terminal, thereby completing transmission of the system information and initial access.

Therefore, when the base station can distinguish the request for system information and/or the request for initial access from the terminal, the base station can carry different information contents by transmitting the MSG2 to meet various requirements of the terminal, where it is not necessary to construct new signaling, and the two processes can be performed simultaneously, which can save signaling and improve the system efficiency.

In the embodiment of the present disclosure, when the base station receives the MSG1 transmitted by the terminal, the access purpose of the terminal can be determined according to the preset mapping relationship between the PRACH resource used by the terminal to transmit the MSG1 and the access purpose of the terminal; when the access purpose of the terminal is to request the system information, or to request the system information and the initial access at one time, the MSG2 including the system information or including the scheduling information corresponding to the system information may be transmitted to the terminal, thereby implementing transmission of the system information. Functions of MSG1 and MSG2 are expanded, and the transmission of the system information can be completed without adding new signaling, which is conducive to saving signaling resources. And a compatibility with a random access interaction process of the terminal is enabled, which is conducive to improving the system efficiency.

Of course, the terminal may also attach identifier information of the access purpose to the transmitted MSG1, and the identifier information may be pre-agreed with the base station or may be configured by default by the system. After receiving the MSG1, the base station may also learn the access purpose of the terminal according to the identifier information, and then return a corresponding MSG2 to the terminal, which is not limited in the embodiments of the present disclosure in any way.

Figure 3:
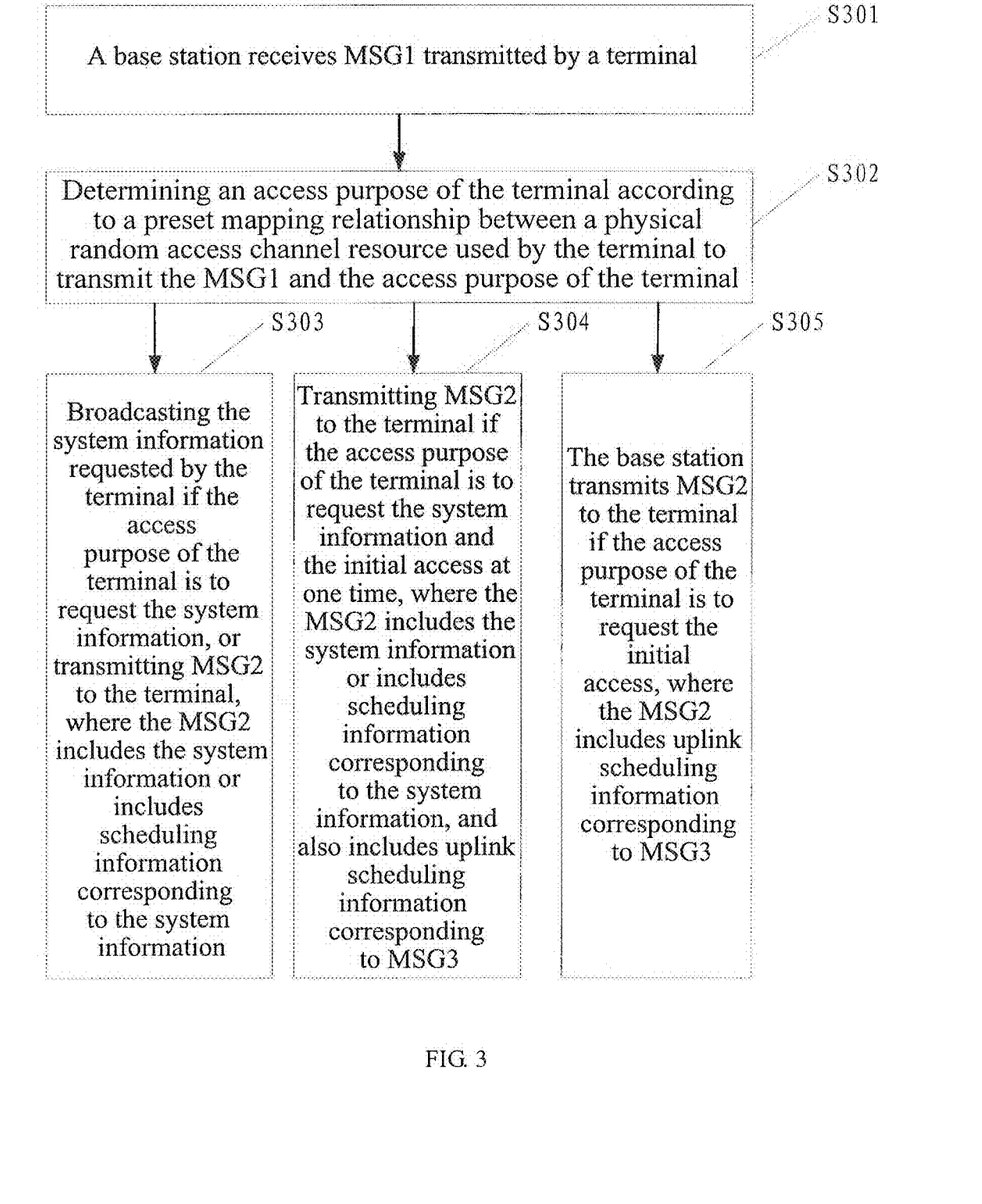
FIG. 3 is a schematic flow chart of a second embodiment of a method for transmitting system information according to the present disclosure.

Reference is made to FIG. 3, which is a schematic flowchart of a second embodiment of a method for transmitting system information according to the present disclosure; in this embodiment, the method includes the following steps.

S301: a base station receives MSG1 transmitted by a terminal.

S302: determining an access purpose of the terminal according to a preset mapping relationship between a physical random access channel resource used by the terminal to transmit the MSG1 and the access purpose of the terminal.

The access purpose includes requesting system information, requesting initial access, or requesting system information and initial access at one time.

S303: broadcasting the system information requested by the terminal if the access purpose of the terminal is to request the system information, or transmitting MSG2 to the terminal, where the MSG2 includes the system information or includes scheduling information corresponding to the system information.

S304: transmitting MSG2 to the terminal if the access purpose of the terminal is to request the system information and the initial access at one time, where the MSG2 includes the system information or includes scheduling information corresponding to the system information, and also includes uplink scheduling information corresponding to MSG3.

S305: the base station transmits MSG2 to the terminal if the access purpose of the terminal is to request the initial access, where the MSG2 includes uplink scheduling information corresponding to MSG3.

How the base station flexibly responds according to the access purpose of the terminal transmitting the MSG1 is specifically described in this embodiment. The terminal can use the MSG1 to inform the base station of its different requirements, and the base station can also use the MSG2 to carry different information and transmit it to the terminal. Throughout the information interaction process, different requirements of the terminal can be realized only using MSG1 to MSG4 in the existing random access procedure. Therefore, it is possible to perform the transmission of the system information with the existing signaling, and meanwhile full satisfaction of the terminal's requirements can be ensured, thereby saving signaling resources and improving the system efficiency.

Figure 4:
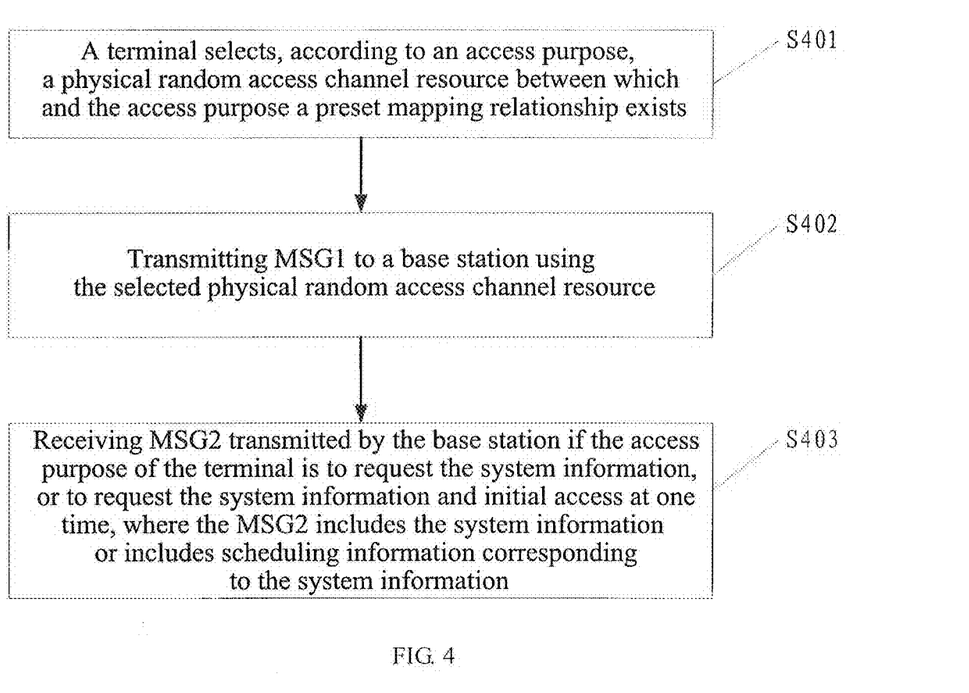
FIG. 4 is a schematic flow chart of a third embodiment of a method for transmitting system information according to the present disclosure.

Reference is made to FIG. 4, which is a schematic flowchart of a third embodiment of a method for transmitting system information according to the present disclosure; in this embodiment, the method includes the following steps:

S401: a terminal selects, according to an access purpose, a physical random access channel resource between which and the access purpose a preset mapping relationship exists.

S402: transmitting MSG1 to a base station using the selected physical random access channel resource.

S403: receiving MSG2 transmitted by the base station if the access purpose of the terminal is to request the system information, or to request the system information and initial access at one time, where the MSG2 includes the system information or includes scheduling information corresponding to the system information.

The preset mapping relationship between the physical random access channel resource and the access purpose of the terminal is a many-to-one mapping or a one-to-one mapping, and the preset mapping relationship is configured by the base station and obtained by the terminal receiving a broadcast message from the base station, or the preset mapping relationship is pre-configured by the system and stored in the base station and the terminal.

FIG. 4 is an illustration of an embodiment of the terminal side, reference for the specific process may be made to the description of the embodiment of the base station side shown in FIG. 2, and details are not described here again.

Figure 5:
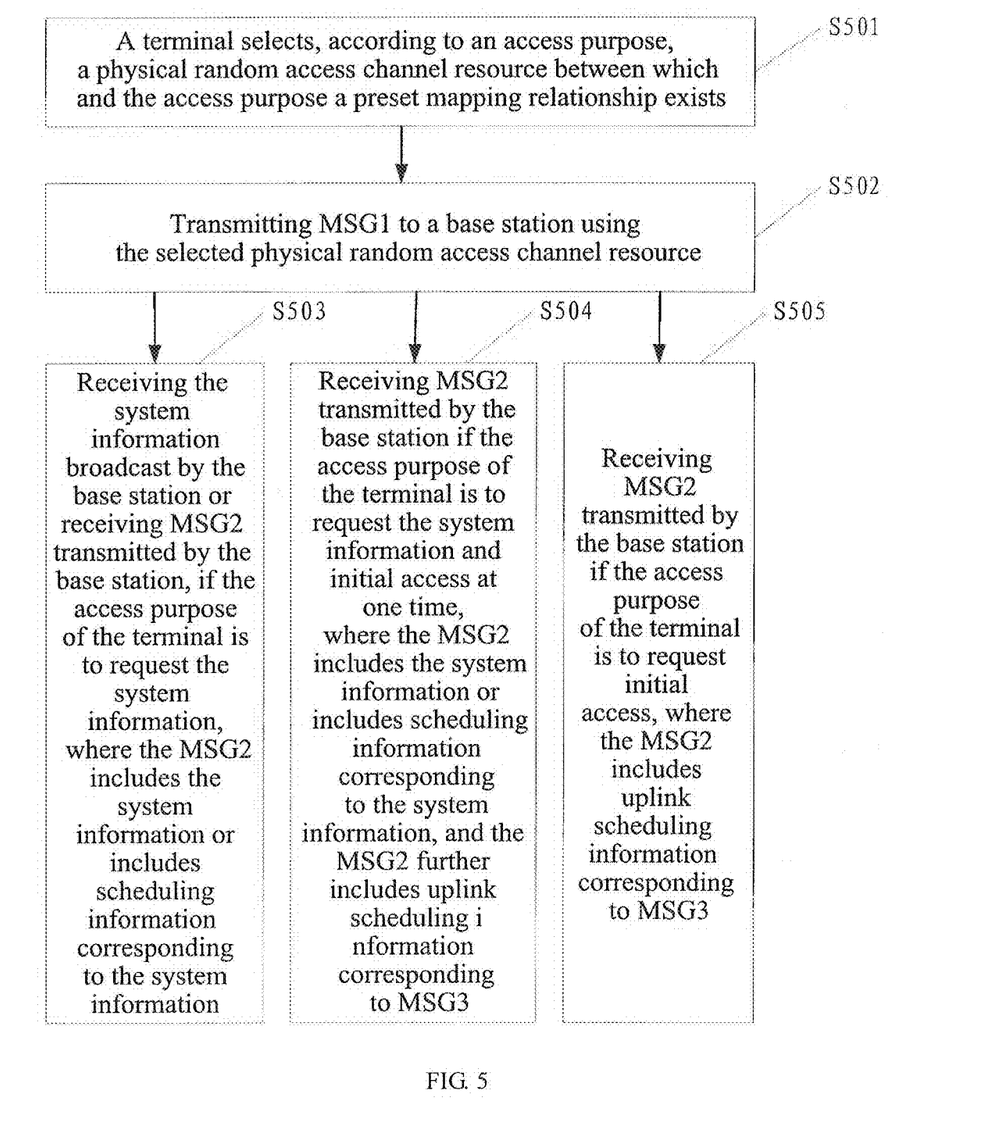
FIG. 5 is a schematic flow chart of a fourth embodiment of a method for transmitting system information according to the present disclosure.

Reference is made to FIG. 5, which is a schematic flowchart of a fourth embodiment of a method for transmitting system information according to the present disclosure; in this embodiment, the method includes the following steps:

S501: a terminal selects, according to an access purpose, a physical random access channel resource between which and the access purpose a preset mapping relationship exists.

S502: transmitting MSG1 to a base station using the selected physical random access channel resource.

S503: receiving the system information broadcast by the base station or receiving MSG2 transmitted by the base station, if the access purpose of the terminal is to request the system information, where the MSG2 includes the system information or includes scheduling information corresponding to the system information.

S504: receiving MSG2 transmitted by the base station if the access purpose of the terminal is to request the system information and initial access at one time, where the MSG2 includes the system information or includes scheduling information corresponding to the system information, and the MSG2 further includes uplink scheduling information corresponding to MSG3.

S505: receiving MSG2 transmitted by the base station if the access purpose of the terminal is to request initial access, where the MSG2 includes uplink scheduling information corresponding to MSG3.

FIG. 5 is an illustration of an embodiment of the terminal side, reference for the specific process is made to the description of embodiment of the base station side shown in FIG. 3, and details are not described here again.

Figure 6:
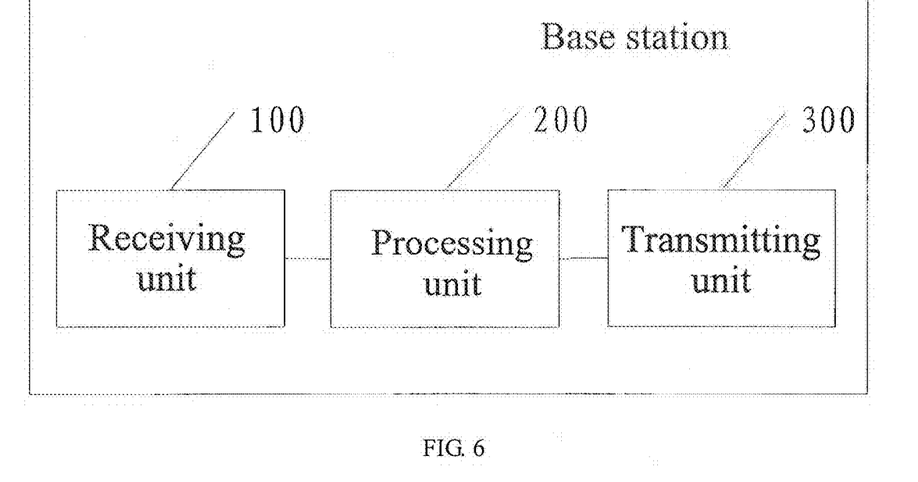
FIG. 6 is a schematic diagram of configuration of a first embodiment of a base station according to the present disclosure.

Reference is made to FIG. 6, which is a schematic diagram of configuration of a first embodiment of a base station according to the present disclosure; in this embodiment, the base station includes:

a receiving unit 100, configured to receive MSG1 transmitted by a terminal;

a processing unit 200, configured to determine an access purpose of the terminal according to a preset mapping relationship between a physical random access channel resource used by the terminal to transmit the MSG1 and the access purpose of the terminal, where the access purpose includes requesting system information, requesting initial access, or requesting the system information and the initial access at one time; and a transmitting unit 300, configured to transmit MSG2 to the terminal if the access purpose of the terminal is to request the system information, or to request the system information and the initial access at one time, where the MSG2 includes the system information or includes scheduling information corresponding to the system information.

In an embodiment, if the access purpose of the terminal is to request the system information, the transmitting unit 300 is further configured to:

broadcast the system information requested by the terminal.

In an embodiment, if the access purpose of the terminal is to request the system information and the initial access at one time, the MSG2 further includes uplink scheduling information corresponding to MSG3.

In an embodiment, if the access purpose of the terminal is to request the initial access, the transmitting unit 300 is further configured to transmit MSG2 to the terminal, where the MSG2 includes uplink scheduling information corresponding to MSG3.

In an embodiment, the preset mapping relationship between the physical random access channel resource and the access purpose of the terminal is a many-to-one mapping or a one-to-one mapping, and the preset mapping relationship is configured by the processing unit 200 and notified to the terminal via a broadcast message, or the preset mapping relationship is pre-configured by the system and stored in the base station and the terminal.

Figure 7:
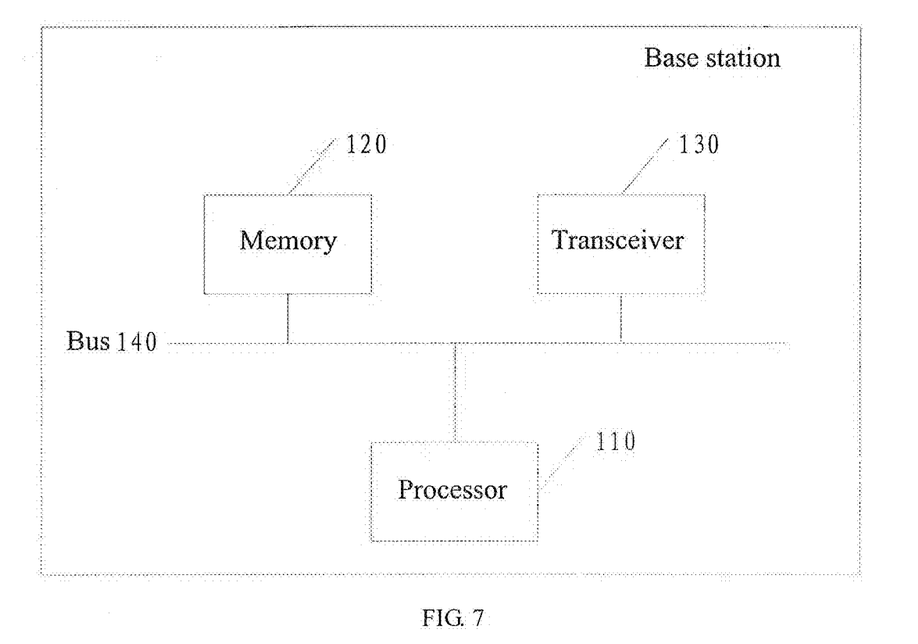
FIG. 7 is a schematic diagram of configuration of a second embodiment of a base station according to the present disclosure.

Reference is made to FIG. 7, which is a schematic diagram of configuration of a second embodiment of a base station according to the present disclosure; in this embodiment, the base station includes:

a processor 110, a memory 120, a transceiver 130, and a bus 140, and the processor 110, the memory 120, and the transceiver 130 are connected to each other by the bus 140, where the transceiver 130 is configured to transmit and receive a signal and communicate with a terminal, the memory 120 is configured to store a set of program codes, and the processor 110 is configured to invoke the program codes stored in the memory 120, and perform the following operations:

receiving, through the transceiver, MSG1 transmitted by the terminal;

determining an access purpose of the terminal according to a preset mapping relationship between a physical random access channel resource used by the terminal to transmit the MSG1 and the access purpose of the terminal, where the access purpose includes requesting system information, requesting initial access, or requesting the system information and the initial access at one time; and transmitting, through the transceiver, MSG2 to the terminal, if the access purpose of the terminal is to request the system information, or to request the system information and the initial access at one time, where the MSG2 includes the system information or includes scheduling information corresponding to the system information.

In an embodiment, if the access purpose of the terminal is to request the system information, the processor 110 is further configured to:

broadcast, through the transceiver 130, the system information requested by the terminal.

In an embodiment, if the access purpose of the terminal is to request the system information and the initial access at one time, the MSG2 further includes uplink scheduling information corresponding to MSG3.

In an embodiment, if the access purpose of the terminal is to request the initial access, the processor 110 is further configured to transmit MSG2 to the terminal by the transceiver 130, where the MSG2 includes uplink scheduling information corresponding to MSG3.

In an embodiment, the preset mapping relationship between the physical random access channel resource and the access purpose of the terminal is a many-to-one mapping or a one-to-one mapping, and the preset mapping relationship is configured by the processor 110 and notified to the terminal via a broadcast message, or the preset mapping relationship is pre-configured by the system and stored in the base station and the terminal.

Figure 8:
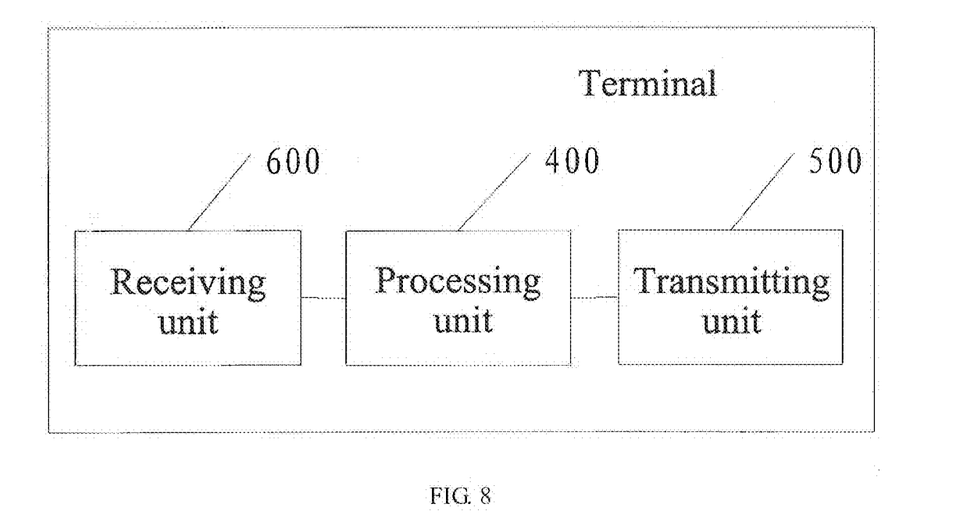
FIG. 8 is a schematic diagram of configuration of a first embodiment of a terminal of the present disclosure.

Reference is made to FIG. 8, which is a schematic diagram of configuration of a first embodiment of a terminal of the present disclosure, and in this embodiment, the terminal includes:

a processing unit 400, configured to select, according to an access purpose, a physical random access channel resource between which and the access purpose a preset mapping relationship exists, where the access purpose includes requesting system information, requesting initial access, or requesting the system information and the initial access at one time;

a transmitting unit 500, configured to transmit MSG1 to a base station using the selected physical random access channel resource; and a receiving unit 600, configured to receive MSG2 transmitted by the base station if the access purpose of the terminal is to request the system information, or to request the system information and the initial access at one time, where the MSG2 includes the system information or includes scheduling information corresponding to the system information.

In an embodiment, if the access purpose of the terminal is to request the system information, the receiving unit 600 is further configured to:

receive the system information broadcast by the base station.

In an embodiment, if the access purpose of the terminal is to request the system information and the initial access at one time, the MSG2 further includes uplink scheduling information corresponding to MSG3.

In an embodiment, if the access purpose of the terminal is to request the initial access, the receiving unit 600 is further configured to receive MSG2 transmitted by the base station, where the MSG2 includes uplink scheduling information corresponding to MSG3.

In an embodiment, the preset mapping relationship between the physical random access channel resource and the access purpose of the terminal is a many-to-one mapping or a one-to-one mapping, and the preset mapping relationship is configured by the base station and obtained by the receiving unit 600 receiving a broadcast message from the base station, or the preset mapping relationship is pre-configured by the system and stored in the base station and the terminal.

Figure 9:
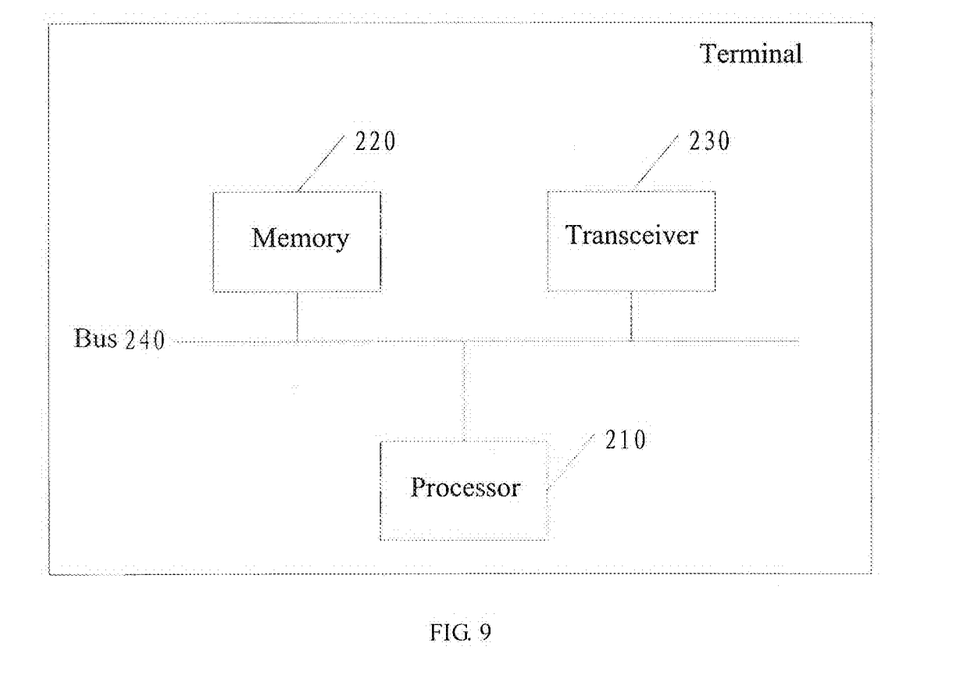
FIG. 9 is a schematic diagram of configuration of a second embodiment of a terminal of the present disclosure.

Reference is made to FIG. 9, which is a schematic diagram of configuration of a second embodiment of a terminal of the present disclosure; in this embodiment, the terminal includes:

a processor 210, a memory 220, a transceiver 230, and a bus 240, and the processor 210, the memory 220, and the transceiver 230 are connected to each other by the bus 240, where the transceiver 230 is configured to transmit and receive a signal, and communicate with a base station, the memory 220 is configured to store a set of program codes, and the processor 210 is configured to invoke the program codes stored in the memory 220, and perform the following operations:

selecting, according to an access purpose, a physical random access channel resource between which and the access purpose a preset mapping relationship exists, where the access purpose includes requesting system information, requesting initial access, or requesting the system information and the initial access at one time;

transmitting MSG1 to a base station through the transceiver using the selected physical random access channel resource; and receiving, through the transceiver 230, MSG2 transmitted by the base station if the access purpose of the terminal is to request the system information, or to request the system information and the initial access at one time, where the MSG2 includes the system information or includes scheduling information corresponding to the system information.

In an embodiment, if the access purpose of the terminal is to request the system information, the processor 210 is further configured to:

receive, through the transceiver 230, the system information broadcast by the base station.

In an embodiment, if the access purpose of the terminal is to request the system information and the initial access at one time, the MSG2 further includes uplink scheduling information corresponding to MSG3.

In an embodiment, if the access purpose of the terminal is to request the initial access, the processor 210 is further configured to receive, through the transceiver 230, MSG2 transmitted by the base station, where the MSG2 includes uplink scheduling information corresponding to MSG3.

In an embodiment, the preset mapping relationship between the physical random access channel resource and the access purpose of the terminal is a many-to-one mapping or a one-to-one mapping, and the preset mapping relationship is configured by the base station and obtained by the processor 210 receiving a broadcast message from the base station through the transceiver 230, or the preset mapping relationship is pre-configured by the system and stored in the base station and the terminal.

The base station introduced in the embodiments of the present disclosure may be used to implement some or all of the processes in the method embodiments described in conjunction with FIG. 2 to FIG. 3 in the present disclosure, and perform some or all of the functions of the device embodiments described in conjunction with FIG. 6 in the present disclosure. The terminal introduced in the embodiments of the present disclosure may be used to implement some or all of the processes in the method embodiments described in conjunction with FIG. 4 to FIG. 5 in the present disclosure, and perform some or all of the functions in the device embodiments described in conjunction with FIG. 8 in the present disclosure, and details are not described here again.

In one or more examples, the functions described may be implemented in hardware, software, firmware, or any combination thereof. If implemented in software, the functions may be stored on or transmitted as one or more instructions or codes via a computer readable medium and executed by a hardware-based processing unit. The computer readable medium can comprise a computer readable storage medium (which corresponds to a tangible medium such as a data storage medium) or a communication medium, and the communication media includes, for example, any medium that facilitates transfer of a computer program from one location to another in accordance with a communication protocol. In this manner, a computer readable medium may generally correspond to (1) a non-transitory tangible computer readable storage medium, or (2) a communication medium such as a signal or carrier wave. The data storage medium may be any available medium that can be accessed by one or more computers or one or more processors to retrieve instructions, codes, and/or data structures for implementing the techniques described in this disclosure. The computer program product can comprise a computer readable medium.

By way of example and not limitation, certain computer-readable storage media may include RAM, ROM, EEPROM, CD-ROM or other optical disk storage, magnetic disk storage or other magnetic storage devices, a flash memory, or any other media accessible by a computer and used to store desired program codes in the form of an instruction or data structure. Moreover, any connection can be properly termed a computer-readable medium. For example, if a coaxial cable, a fiber optic cable, a twisted pair, a digital subscriber line (DSL), or a wireless technology (for example, infrared, radio, and microwave) is used to send commands from a website, a server, or other remote sources, the coaxial cable, the fiber optic cable, the twisted pair, the DSL or the wireless technology (for example, infrared, radio, and microwave) is included in the definition of the media. However, it should be understood that the computer-readable storage media and the data storage media do not include connections, carriers, signals, or other transient media, but rather non-transitory tangible storage media. As used herein, a magnetic disk and an optical disk include a compact disk (CD), a laser disk, an optical disk, a digital video disk (DVD), a flexible disk, and a Blu-ray disk, where the magnetic disk typically replicates data magnetically, while the optical disk optically replicate data through lasers. Combinations of the above should also be included in the scope of the computer-readable media.

Instructions can be executed by one or more processors, for example, one or more digital signal processors (DSPs), general purpose microprocessors, application specific integrated circuits (ASICs), field programmable logic arrays (FPGAs), or other equivalent integrated or discrete logic circuits. Accordingly, the term "processor" as used herein may refer to any of the foregoing structures or any other structure suitable for implementing the techniques described herein. Additionally, in some aspects, the functionality described herein may be provided within dedicated hardware and/or software modules configured for encoding and decoding, or incorporated in a combined codec. Moreover, the techniques can be fully implemented in one or more circuits or logic elements.

The techniques of this disclosure may be broadly implemented by a variety of apparatuses or devices, the apparatuses or devices comprise a wireless handset, an integrated circuit (IC) or an IC set (e.g., a chipset). Various components, modules or units are described in this disclosure to emphasize functional aspects of devices configured to perform the disclosed techniques, but are not necessarily required to be implemented by different hardware units. Rather, as described above, the various units may be combined in a codec hardware unit or provided by a collection of interoperable hardware units (including one or more processors as described above) in conjunction with suitable software and/or firmware.

It should be understood that "one embodiment" or "an embodiment" referred to throughout the specification means that a particular feature, structure, or characteristic relating to an embodiment is included in at least one embodiment of the present disclosure. Therefore, "in one embodiment" or "in an embodiment", which is used throughout the specification, does not necessarily mean a same embodiment. Furthermore, these specific features, structures, or characteristics may be combined in any suitable manner in one or more embodiments.

In various embodiments of the present disclosure, it should be understood that the size of the sequence numbers of the above processes does not mean the order of execution, and the order of execution of each process should be determined by its function and internal logic, and should not constitute any limitation on the implementation process of the embodiments of the present disclosure.

In addition, the terms "system" and "network" are often used interchangeably herein. It should be understood that the term "and/or" in this context is merely an association describing the associated objects, indicating that there may be three relationships, for example, a and/or B, can represent three cases: a exists alone, there are A and B at a same time, and B exists separately. In addition, the character "/" herein generally indicates that the contextual objects are in an "or" relationship.

In the embodiments provided by the present application, it should be understood that "B corresponding to A" means that B is associated with A, and B can be determined according to A. However, it should also be understood that determining B according to A does not mean that B is determined only on the basis of A, and that B can also be determined based on A and/or other information.

Those of ordinary skill in the art will appreciate that the units and algorithm steps of the various examples described in connection with the embodiments disclosed herein can be implemented in electronic hardware, computer software, or a combination of both. In order to clearly illustrate the interchangeability of hardware and software, the configuration and steps of the examples have been generally described in terms of function in the above description. Whether these functions are implemented in hardware or software depends on the specific application and design constraints of the technical solution. A skilled person can use different methods for each particular application to implement the described functionality, but such implementation should not be considered to be beyond the scope of the present disclosure.

It will be apparent to those skilled in the art that, for convenience and brevity of description, reference for the specific working processes of the systems, devices, and units described above may be made to the corresponding processes in the foregoing method embodiments, and details are not described here again.

In several embodiments provided by the present application, it should be understood that the disclosed system, device, and method may be implemented in other manners. For example, the device embodiments described above are merely illustrative, for example, the division of the unit is only a logical function division, there may be additional divisions in actual implementation, for example, multiple units or components may be combined or integrated into another system, or some features may be ignored, or not implemented. In addition, the mutual coupling or direct coupling or communication connection shown or discussed may be an indirect coupling or communication connection through some interface, device or unit, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the embodiment.

In addition, each functional unit in each embodiment of the present disclosure may be integrated into one processing unit, or each unit may exist physically separately, or two or more units may be integrated into one unit.

The above description only relates to specific implementations of the present disclosure, but the scope of protection of the present disclosure is not limited thereto, and any person skilled in the art can easily conceive changes or substitutions within the scope of the present disclosure, which should be covered by the scope of the present disclosure. Therefore, the scope of protection of the present disclosure shall be subject to the scope of protection of the claims.

What is claimed is:

1. A method for transmitting system information, comprising:

selecting, by a terminal and according to an access purpose, a physical random access channel resource, wherein a preset mapping relationship exists between the physical random access channel resource and the access purpose, the access purpose comprises requesting the system information and initial access at one time, the preset mapping relationship between the physical random access channel resource and the access purpose of the terminal is a many-to-one mapping or a one-to-one mapping, and the preset mapping relationship is pre-configured by a system and stored in the base station and the terminal;

transmitting MSG1 to a base station using the selected physical random access channel resource; and receiving MSG2 transmitted by the base station, the MSG2 comprising the system information or scheduling information corresponding to the system information, and the MSG2 further comprising uplink scheduling information corresponding to MSG3.

2. The method according to claim 1, further comprising:
transmitting, by the terminal, an RRC connection request to the base station according to the uplink scheduling information corresponding to MSG3; and
receiving, by the terminal, MSG4 transmitted by the base station to complete a random access.

3. The method according to claim 1, wherein the physical random access channel resource comprises a time-frequency resource.

4. The method according to claim 1, wherein the MSG1 comprises identifier information of the access purpose, and the identifier information is pre-agreed with the base station or is configured by default by the system.

5. A base station, comprising:
a processor, a memory, a transceiver and a bus, the processor, the memory and the transceiver being connected to each other by the bus, wherein the transceiver is configured to transmit and receive a signal and communicate with a terminal, the memory is configured to store a set of program codes, and the processor is configured to invoke the program codes stored in the memory, and perform the following operations:
receiving, through the transceiver, MSG1 transmitted by the terminal;
determining an access purpose of the terminal according to a preset mapping relationship between a physical random access channel resource used by the terminal to transmit the MSG1 and the access purpose of the terminal, the access purpose comprising requesting the system information and initial access at one time, the preset mapping relationship between the physical random access channel resource and the access purpose of the terminal being a many-to-one mapping or a one-to-one mapping, and the preset mapping relationship being pre-configured by a system and stored in the base station and the terminal; and
transmitting, through the transceiver, MSG2 to the terminal, the MSG2 comprising the system information or scheduling information corresponding to the system information, and the MSG2 further comprising uplink scheduling information corresponding to MSG3.

6. The base station according to claim 5, wherein the processor is further configured to invoke the program codes stored in the memory, and perform the following operations:
receiving, through the transceiver, an RRC connection request, wherein the RRC connection request is transmitted by the terminal according to the uplink scheduling information corresponding to MSG3; and
transmitting, through the transceiver, MSG4 to the terminal, wherein the MSG4 is used for the terminal to complete a random access.

7. The base station according to claim 5, wherein the physical random access channel resource comprises a time-frequency resource.

8. The base station according to claim 5, wherein the MSG1 comprises identifier information of the access purpose, and the identifier information is pre-agreed with the terminal or is configured by default by the system.

9. A terminal, comprising:
a processor, a memory, a transceiver and a bus, the processor, the memory, and the transceiver being connected to each other by the bus, wherein the transceiver is configured to transmit and receive a signal and communicate with a base station, the memory is configured to store a set of program codes, and the processor is configured to invoke the program codes stored in the memory, and perform the following operations:
selecting, according to an access purpose, a physical random access channel resource, wherein a preset mapping relationship exists between the physical random access channel resource and the access purpose, the access purpose comprises requesting the system information and initial access at one time, the preset mapping relationship between the physical random access channel resource and the access purpose of the terminal is a many-to-one mapping or a one-to-one mapping, and the preset mapping relationship is pre-configured by a system and stored in the base station and the terminal;
transmitting MSG1 to a base station through the transceiver using the selected physical random access channel resource; and
receiving, through the transceiver, MSG2 transmitted by the base station, the MSG2 comprising the system information or scheduling information corresponding to the system information, and the MSG2 further comprising uplink scheduling information corresponding to MSG3.

10. The terminal according to claim 9, the processor is further configured to invoke the program codes stored in the memory, and perform the following operations:
transmitting, through the transceiver, an RRC connection request to the base station according to the uplink scheduling information corresponding to MSG3; and
receiving, through the transceiver, MSG4 transmitted by the base station to complete a random access.

11. The terminal according to claim 9, wherein the physical random access channel resource comprises a time-frequency resource.

12. The terminal according to claim 9, wherein the MSG1 comprises identifier information of the access purpose, and the identifier information is pre-agreed with the base station or is configured by default by the system.

* * * * *